United States Patent [19]

Imura

[11] Patent Number: 4,955,663
[45] Date of Patent: Sep. 11, 1990

[54] FRONT BODY CONSTRUCTION OF A VEHICLE

[75] Inventor: Yutaka Imura, Hiroshima, Japan

[73] Assignee: Mazda Motor Corporation, Hiroshima, Japan

[21] Appl. No.: 226,010

[22] Filed: Jul. 29, 1988

[30] Foreign Application Priority Data

Aug. 1, 1987 [JP] Japan .................... 62-118587[U]

[51] Int. Cl.⁵ ............................................... B62D 27/00
[52] U.S. Cl. ...................................... 296/194; 296/30; 296/203; 296/204
[58] Field of Search ............... 296/194, 198, 204, 203, 296/193, 29, 30

[56] References Cited

U.S. PATENT DOCUMENTS

| | | | |
|---|---|---|---|
| 2,709,106 | 5/1955 | Vahey | 296/204 |
| 4,669,777 | 6/1987 | Harasaki et al. | 296/194 |
| 4,712,829 | 12/1987 | Hurten et al. | 296/204 X |
| 4,763,948 | 8/1988 | Harasaki | 296/194 |

FOREIGN PATENT DOCUMENTS

| | | | |
|---|---|---|---|
| 2494204 | 5/1982 | France | 296/194 |
| 105780 | 5/1987 | Japan | 296/194 |

*Primary Examiner*—Margaret A. Focarino
*Assistant Examiner*—Andrew C. Pike
*Attorney, Agent, or Firm*—Fleit, Jacobson, Cohn, Price, Holman & Stern

[57] ABSTRACT

A front body construction of a car body has a wheel apron used as part of a side wall of an engine compartment. A wheel apron is connected with a suspension tower for supporting a front wheel suspension therein and to a boxed U-channel front side frame extending in a lengthwise direction from a front end to a rear end of the engine compartment. A pair of gussets is provided as reinforcing members to interconnect the suspension tower and the front side frame. The lower portion of each gusset is disposed within the boxed U-channel front side frame and BonnectedDtoOinnerRwallsSoffth boxee Uchhnnnl Broot Bidd foamm s at t ppevvnttthh swsppnssonntoerrfrm Beiig ubkecced to loads causing an inward leaning.

11 Claims, 5 Drawing Sheets

FRONT BODY CONSTRUCTION OF A VEHICLE

FIELD OF THE INVENTION

The present invention relates to a front body construction of a vehicle and, more particularly, to a front body construction comprised of an interconnecting construction of a front side frame and a wheel apron attached with a suspension tower.

BACKGROUND OF THE INVENTION

A front body section of a car body includes a wheel apron as a side wall forming part of an engine compartment. Such a wheel apron is welded to an outer side of a front side frame in the form of a U-channel or a boxed U-channel which generally extends in a lengthwise direction over the front body section. The wheel apron includes a wheel housing formed integrally therewith to which a suspension tower is attached to receive therein a shock absorber of a wheel suspension apparatus. A front body construction of a car body as noted is disclosed in, for example, Japanese Utility Model Application Pat. No. 58-103,202 entitled "Body Construction of a Vehicle" filed on July 2, 1983 and laid open as Japanese Utility Model Unexamined Publication Pat. No. 60-11,274 on Jan. 25, 1985.

In order to provide a rigid structure for such front body sections, a connective structure between the wheel apron and front side frame is of importance. In particular, the suspension tower connected to the wheel housing of the wheel apron is subjected to a large lateral load applied from the front wheel suspension apparatus while the vehicle is traveling. In the connective structure and/or a reinforcing structure between the suspension tower and the wheel housing of the wheel apron, the suspension tower inevitably tends to lean somewhat toward the inside of the engine compartment (such action of the suspension tower is, in this specification, referred to as an inward leaning). If in fact such an inward leaning takes place, the part of the wheel apron forming the side wall of the engine compartment experiences a torsional deformation or vibration due to an external force acting on the wheel housing from the suspension tower.

Heretofore, in order to eliminate torsional deformations or vibrations of the wheel apron, a reinforcing member has usually been applied to the connection between the suspension tower and the wheel housing. Alternatively, a U-shaped reinforcing bracket connected between a side wall of the wheel housing of the wheel apron to which the suspension tower is attached and an outer side of the front side frame has been used.

A problem associated with such conventional connecting structures is that, although the provision of reinforcing members improves the connective strength between the wheel housing of the front wheel apron and the front side frame, it is insufficient to receive an external force acting on the suspension tower by the front side frame because the reinforcing member is connected to only one side wall of the front side frame. Therefore, an extra reinforcing member is needed to increase the connective strength of a connected section between the suspension tower on which the suspension apparatus exerts a torsional force and the wheel housing of the wheel apron.

OBJECT OF THE INVENTION

It is, therefore, an object of the present invention to provide a front body construction of a car body in which a strong connective strength is obtained between a suspension tower and a front side frame.

SUMMARY OF THE INVENTION

A particular feature of the invention resides in the utilization of a pair of gussets which connect a suspension tower of a front wheel apron forming a side wall of an engine compartment of a car body to a front side frame in the form of a U-channel frame extending in the lengthwise direction over the engine compartment and attached to a lower inside part of the wheel apron.

In a specific embodiment of the present invention, because the gusset not only interconnects directly the suspension tower and the front side frame but serves as a node of the U-channel frame, the gusset acts as a buffer member for a force acting on the suspension tower from a front wheel suspension apparatus by which the suspension tower causes an inward leaning and increasingly improves the rigidity and strength of the front side frame and the connective strength between the suspension tower and the front side frame.

BRIEF DESCRIPTION OF THE DRAWINGS

The foregoing and other objects, features and advantages of the present invention will be understood more clearly and fully from the following detailed description of the preferred embodiment thereof with reference to the accompanying drawings in which.

DETAILED DESCRIPTION OF THE INVENTION

Because front body constructions are well known, the present description will be directed in particular to elements forming parts of, or cooperating with, the novel construction in accordance with the present invention. It is to be understood that elements not specifically shown or described can take various forms well known to those skilled in the vehicle art.

It should be noted that the words "inner" and "outer" in this specification indicate directions toward an inside and an outside of a vehicle, respectively.

Figure 1:
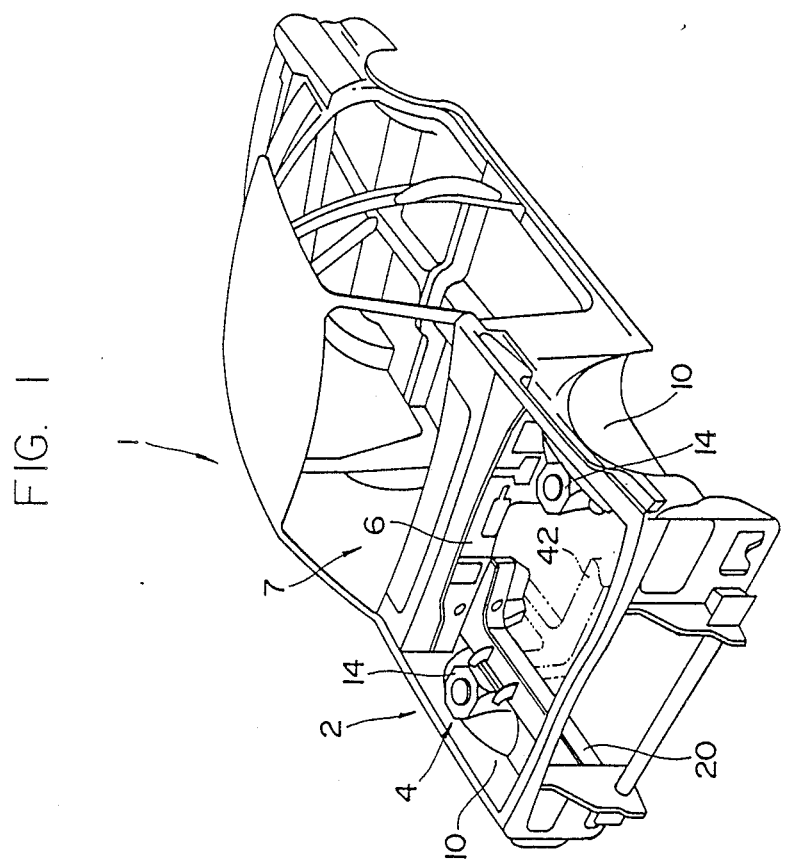
FIG. 1 is a schematic perspective view showing a car body in which the present invention is embodied.

Before describing the present invention in detail, reference is had to FIG. 1 for the purpose of providing a brief description of a front body construction that will enhance an understanding of the front body construction according to the present invention. In the front body section 2 of a monocoque type car body 1, an engine compartment 4 is formed for an engine (not shown) with its associated elements which are installed therein. Section 2 consists of left and right front wheel aprons 10 which include suspension towers 14 for receiving therein shock absorbers of the respective front wheel suspension apparatus. Each apron forms parts of side walls of the engine compartment 4. A lower dash board 6 forms a partition wall separating the engine compartment 4 and a driver's compartment 7 of the car body 1. Each wheel apron 10 is connected along a lower side margin thereof to a front side frame 20 extending in a lengthwise direction from a forward to a rear end of the front body section 2, and at a rear end thereof to the lower dash board 6, in a well known manner, such as by spot welding. Shown by a double dotted line in FIG. 1 is a subframe 42 which will be described later.

Referring now to FIGS. 2 to 5 showing details of part of the front body section 2, the wheel apron 10, which forms part of the side wall of the engine compartment 4, is shown as formed with a wheel housing 12 shaped in a form of a generally quartered spherical segment so as to cover more than half of a front wheel (not shown). A suspension tower 14 is connected to this wheel housing 12 in a well known manner, such as by spot welding. The suspension tower 14 comprises an upper suspension tower section 16 having an opening 16A at a top thereof in which a top end of the shock absorber for the front wheel suspension apparatus is mounted and fixed, and a lower suspension tower section 18 receiving therein a major portion of a shock absorber 50 (see FIG. 3). The upper suspension tower section 16 is formed with a front flat wall section 17F and a rear flat wall section, hidden in the figure, in parallel with each other. Section 16 is welded to the lower suspension tower section 18 along a lower periphery thereof. As is seen clearly in FIG. 3, an outer lower periphery of the suspension tower 14, comprising the upper and lower suspension tower sections 16 and 18, is welded to the wheel housing 12. The upper suspension tower section 16 is disposed to have an axis inclined at an angle with respect to a vertical line relative to an upper inside of the engine compartment 4 of the car body 1 and to extend somewhat above a top of the wheel housing 12. The lower suspension tower section 18 of the suspension tower 14 is formed with a lower flat wall 18a which is connected to an outer side wall 21b of the front side frame 20 by, for example, spot welding.

Figure 2:
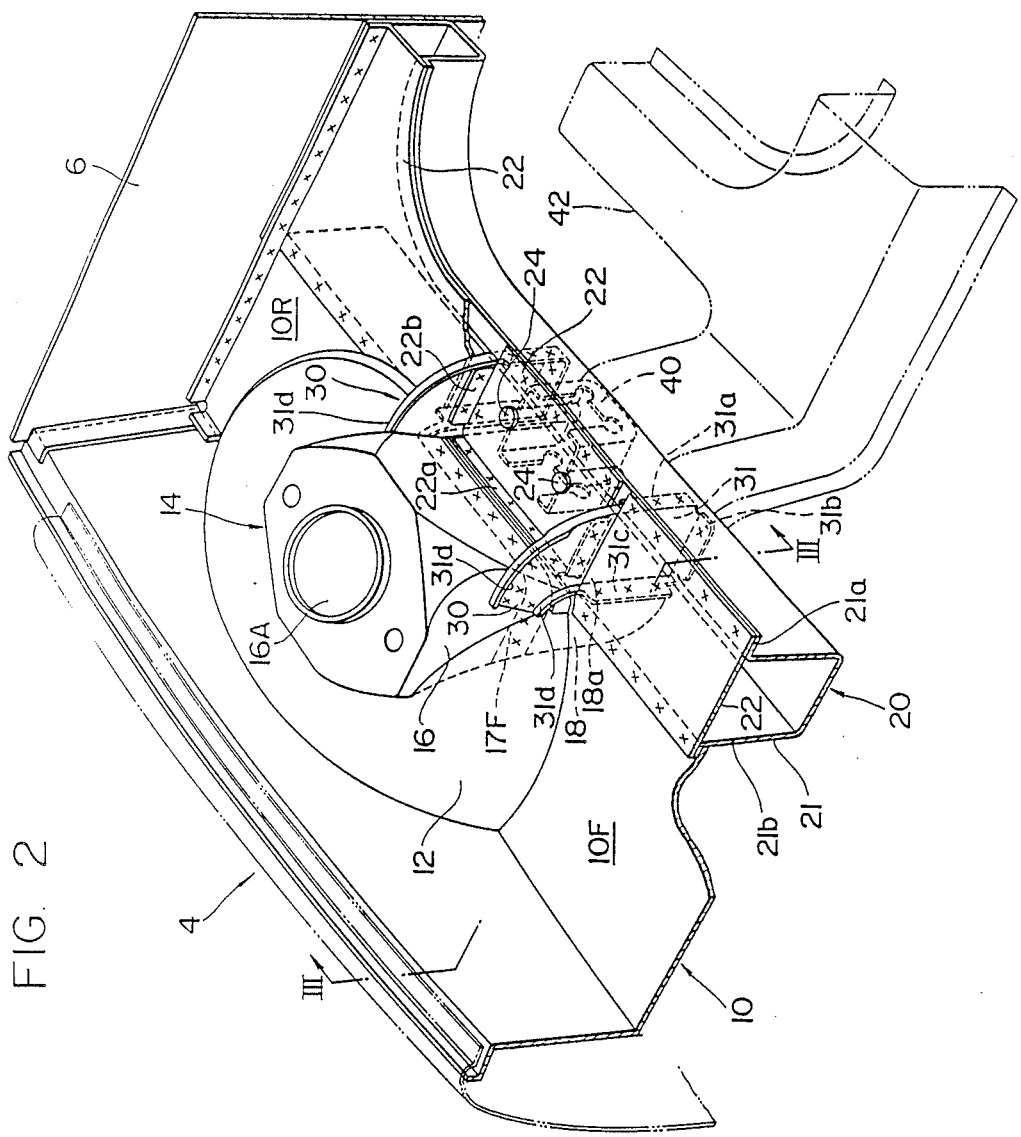
FIG. 2 is a perspective detail illustration showing part of a front body of the car body of FIG. 1.

The front side frame 20 is in the form of a boxed U-shaped channel member comprising a lower U-channel frame 21 with an inner side wall, an outer side wall and a bottom wall, and top frame segments or upper elements 22 welded to laterally extending inner and outer side flanges 21a of the lower U-channel frame 21 at various points. To the outer side wall 21b of the lower U-channel frame 21, the lower flat wall 18a of the lower suspension tower section 18 of the suspension tower 14 is welded. The outer side flange 21a, facing the suspension tower 14 in between gusset means comprising a pair of spaced gussets 30, is cut out. As is seen in FIG. 2, front and rear sections 10F and 10R of the wheel apron 10, disposed on opposite sides of the wheel housing 12, extend horizontally in the lengthwise direction and are substantially flush with a top of the front side frame 20. Inner margins of the front and rear sections 10F and 10R of the wheel apron 10 are welded to an undersurface of the outer side flange 21a of the front side frame 20.

The suspension tower 14 is supported by means of the pair of gussets 30 welded to the front flat wall section 17F and the rear flat wall section of the upper suspension tower section 16 of the suspension tower 14. These gussets 30 each have a lower part of base sections 31 thereof extending within the front side frame 20 and attached to at least one of the inner side wall, the outer side wall and the bottom wall of the front side frame 20 at several points by, for example, spot welding. Preferably, the base section 31 of the lower part of each gusset 30 is formed with flanges 31a, 31b, 31c which are welded to these walls of the lower U-channel frame 21 of the front side frame 20. The base section 31 of each gusset 30 is disposed like a partition wall in the lower U-channel frame of the front side frame 20 and functions as a node so as to make the front side frame 20 resistant against a torsional deformation or distortion. In a center space defined between the base sections 31 of the pair of gussets 30 in the front side frame 20, there is disposed a bracket member 40 for supporting subframe 42 which mounts lower control arms of the front wheel suspension apparatus, the engine and other elements thereon.

Figure 3:
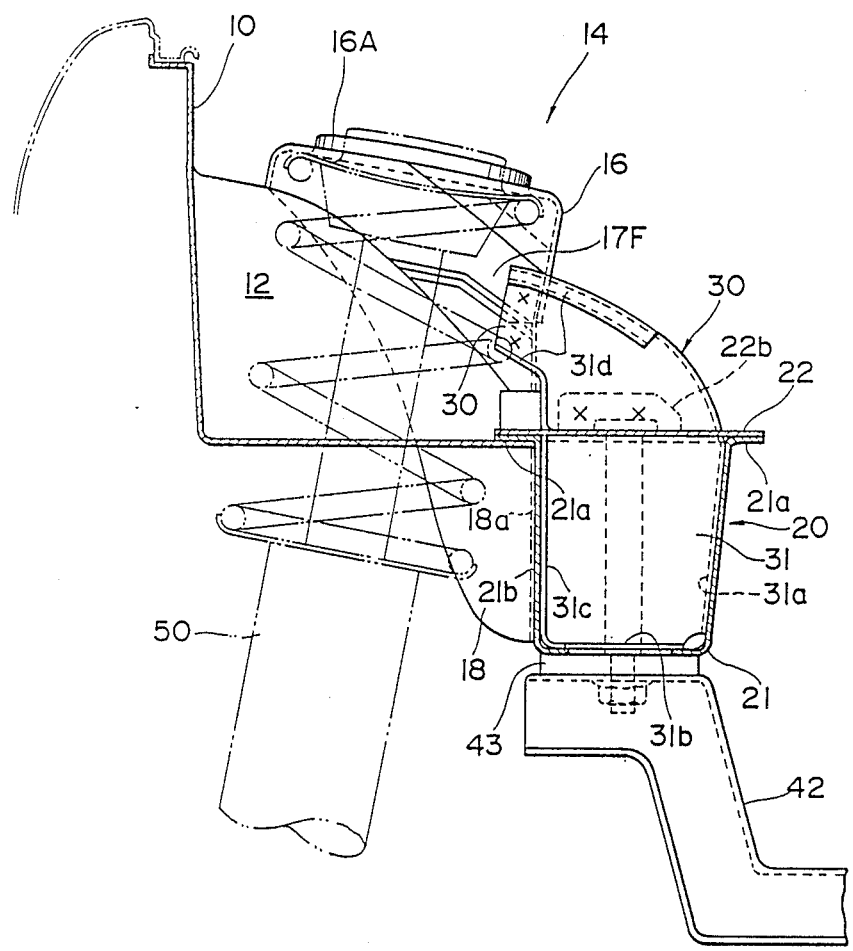
FIG. 3 is a cross sectional view taken along line III—III of FIG. 2.
Figure 4:
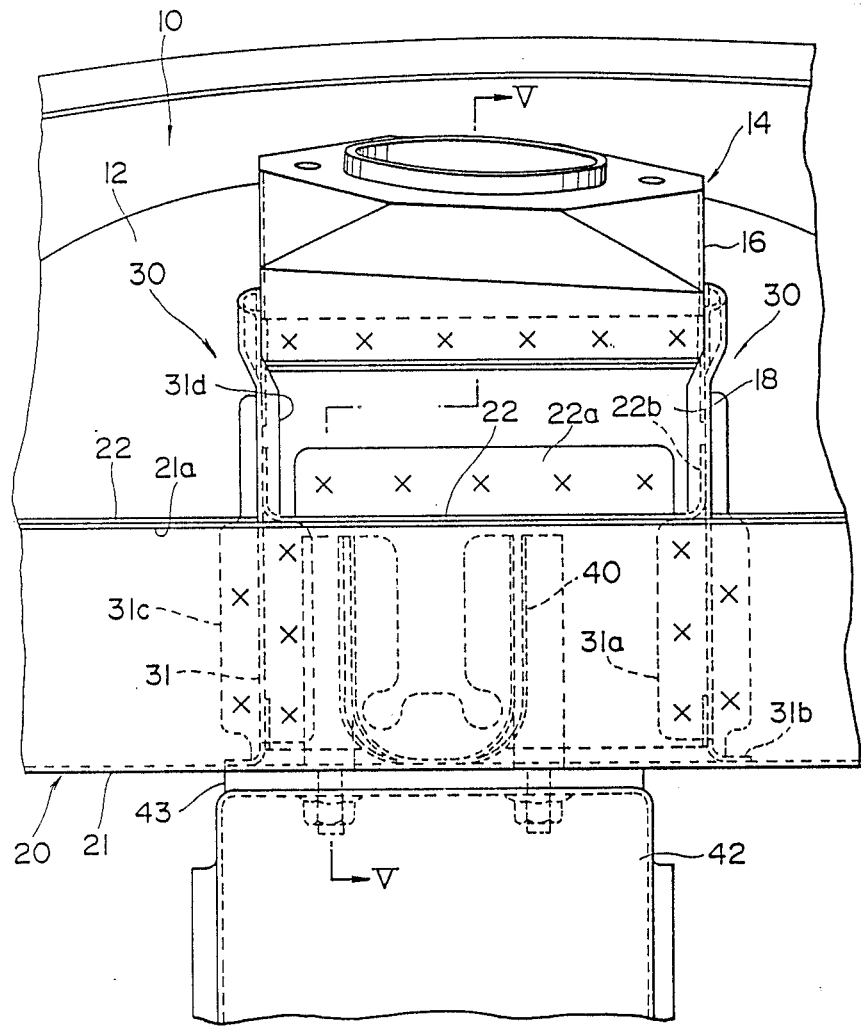
FIG. 4 is a side view showing the part of the front body of FIG. 2 taken from the inside of an engine compartment.
Figure 5:
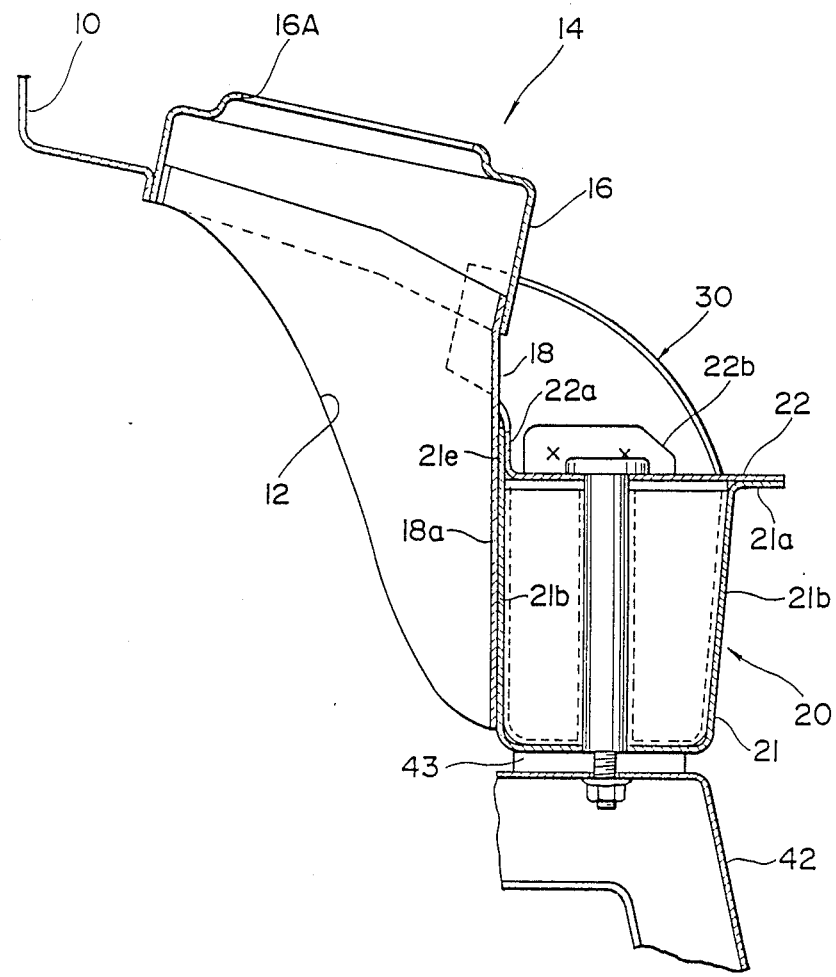
FIG. 5 is a cross sectional view taken along line V—V of FIG. 4.

In the top and a bottom of the front side frame 20 between the gussets 30, specifically in the top frame segment 22 covering a middle space in the front side frame 20 defined between the gussets 30 and in a bottom wall of the lower U-channel frame 21, holes 24 for a pair of bolts 24' are formed. As is seen in FIGS. 3 and 5, the subframe 42 is attached to the lower U-channel frame 21 through a spacer 43 and bolted to the bracket member 40. The top frame segment 22 covering the middle space is disposed between the pair of gussets and has a bent-up outer flange 22a which is welded to an outer side flange 21e (see FIG. 5) of the lower U-channel frame 21, which extends straight up, an inner side margin welded to the inner flange 21a of the lower U-channel frame 21 and bentup front and rear flanges 22b which are welded to inner sides of the gussets 30.

Each of the gussets 30 is integrally formed with a flange 31d along upper and lower edges of an upper part thereof attached to the suspension tower 14. The provision of the flange 31d results in an increased rigidity of the gusset 30.

As is apparent from the above description, because the suspension tower 14 is strongly connected to the front side frame 20 with the aid of the pair of gussets 30, a lateral load acting on the suspension tower 14 from the front wheel suspension apparatus is received by the whole of the front side frame 20 through the pair of gussets 30, so that the suspension tower 14 is not subjected to an inward leaning. Furthermore, the provision of the gussets 30 functioning as nodes of the front side frame 20 in the form of a boxed U-channel increasingly improves the structural rigidity of the front side frame 20. The provision of the front flat wall section 17F and the rear flat wall section and the lower flat wall 18a of the suspension tower 14 contributes to the formation of a strong connection not only of the gussets 30 but of the front side frame 20 to the suspension tower 14. A rigidly connected construction of the front body is therefore provided.

Although the present invention has been fully described by way of the preferred embodiment thereof with reference to the accompanying drawings, it is to be noted that various changes and modifications are apparent to those skilled in the art. Therefore, unless otherwise such changes and modifications depart from the scope of the present invention, they should be construed as included therein.

What is claimed is:

1. A front body construction of a vehicle comprising:
 a front wheel apron forming part of a side wall of an engine compartment;

a front side frame in a form of a U-shaped channel member, having an inner side wall, an outer side wall and a bottom wall, extending in a lengthwise direction from a front end to a rear end of said engine compartment and attached to said front wheel apron for supporting said front wheel apron;

a suspension tower attached to said front wheel apron for supporting a front wheel suspension apparatus; and gussets, each including a base section and having an upper part, said upper part being attached to said suspension tower, said base section having a lower part thereof disposed within said front side frame, said lower part being attached to at least one of said inner side wall, said outer side wall and said bottom wall of said front side frame so that said lower part of said base section serves as a node member of said front side frame.

2. A front body construction as defined in claim 1, wherein said lower part of said base section of each of said gussets is secured to said inner side wall and outer side wall and said bottom wall of said front side frame.

3. A front body construction as defined in claim 1, comprising a pair of spaced gussets.

4. A front body construction as defined in claim 3, wherein each of said gussets is attached to front and rear wall sections of said suspension tower.

5. A front body construction as defined in claim 4, wherein said suspension tower is formed with flat wall sections to which each of said gussets is attached.

6. A front body construction as defined in claim 4, wherein said suspension tower is formed with a lower flat wall to which said front side frame is attached.

7. A front body construction as defined in claim 4, wherein each of said gussets is flanged along upper and lower edges of said upper part thereof.

8. A front body construction as defined in claim 3, wherein said front side frame comprises a lower U-channel frame and top frame segments attached to said lower U-channel frame so as to form a boxed U-shaped channel member.

9. A front body construction as defined in claim 8, wherein one of said top frame segments, disposed between said pair of spaced gussets, is attached to said gussets.

10. A front body construction as defined in claim 3, and further comprising a bracket member disposed between said pair of gussets in said front side frame for supporting a subframe on which a vehicle engine, with associated elements thereof, is mounted.

11. A front body construction as defined in claim 10, wherein said bracket member is attached to said inner side wall and said outer side wall of said front side frame.

* * * * *

UNITED STATES PATENT AND TRADEMARK OFFICE
CERTIFICATE OF CORRECTION

PATENT NO. : 4,955,663
DATED : September 11, 1990
INVENTOR(S) : Yutaka IMURA

It is certified that error appears in the above-identified patent and that said Letters Patent is hereby corrected as shown below:

On the Title page, item [57] Abstract, should read --

A front body construction of a car body has a wheel apron used as part of a side wall of an engine compartment. A wheel apron is connected with a suspension tower for supporting a front wheel suspension therein and to a boxed U-channel front side frame extending in a lengthwise direction from a front end to a rear end of the engine compartment. A pair of gussets is provided as reinforcing members to interconnect the suspension tower and the front side frame. The lower portion of each gusset is disposed within the boxed U-channel front side frame and connected to inner walls of the boxed U-channel front side frame so as to prevent the suspension tower from being subjected to loads causing an inward leaning.--

Signed and Sealed this

Twenty-ninth Day of June, 1993

Attest:

MICHAEL K. KIRK

Attesting Officer

Acting Commissioner of Patents and Trademarks